(12) United States Patent
Huck et al.

(10) Patent No.: US 11,679,789 B2
(45) Date of Patent: Jun. 20, 2023

(54) HOPPER RAILCAR COMPOSITE PARTITION

(71) Applicant: Trinity Rail Group, LLC, Dallas, TX (US)

(72) Inventors: Kenneth W. Huck, Fairview, TX (US); Codrington E. Barzey, Melbourne, FL (US); Ricky A. Cribbs, Ovilla, TX (US); Scott M. Lewit, Indialantic, FL (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 352 days.

(21) Appl. No.: 16/984,698

(22) Filed: Aug. 4, 2020

(65) Prior Publication Data

US 2021/0039686 A1 Feb. 11, 2021

Related U.S. Application Data

(60) Provisional application No. 62/882,727, filed on Aug. 5, 2019.

(51) Int. Cl.
| | |
|---|---|
| *B61D 17/04* | (2006.01) |
| *B61D 7/02* | (2006.01) |
| *B61D 17/08* | (2006.01) |
| *B61D 17/10* | (2006.01) |
| *B32B 5/02* | (2006.01) |

(52) U.S. Cl.
CPC .............. *B61D 17/048* (2013.01); *B61D 7/02* (2013.01); *B61D 17/08* (2013.01); *B61D 17/10* (2013.01); *B32B 5/02* (2013.01)

(58) Field of Classification Search
CPC ........ B61D 7/02; B61D 17/00; B61D 17/005; B61D 17/04; B61D 17/041; B61D 17/043; B61D 17/048; B61D 17/06; B61D 17/08; B61D 17/10; B61D 49/00; B61D 7/00–7/32; B61D 5/00–5/08; B32B 5/02
USPC .......................................................... 105/251
See application file for complete search history.

(56) References Cited

U.S. PATENT DOCUMENTS

| | | | | |
|---|---|---|---|---|
| 3,557,714 A | * | 1/1971 | Aquino ..................... | B61D 7/00 105/247 |
| 4,246,849 A | * | 1/1981 | Gramse .................... | B61D 7/08 105/248 |
| 4,301,742 A | * | 11/1981 | Patil ......................... | B61D 7/00 105/406.1 |

(Continued)

*Primary Examiner* — Zachary L Kuhfuss
*Assistant Examiner* — Cheng Lin
(74) *Attorney, Agent, or Firm* — Baker Botts L.L.P.

(57) ABSTRACT

According to some embodiments, a railcar comprises at least two hoppers for transporting a commodity. Each hopper comprises a pair of side walls and a floor. The railcar further comprises a composite partition separating the hoppers. The composite partition comprises a frame comprising a first material coupled to the pair of side walls and the floor at a location separating hoppers. The frame comprises a center opening. The frame is configured to provide structural support for structural loads exerted on the pair of side walls and the floor. The composite partition further comprises a composite section comprising a second material coupled to the frame and covering the central opening of the frame. The composite section is configured to withstand loads exerted on the composite section by the commodity transported in the hoppers.

18 Claims, 6 Drawing Sheets

(56) References Cited

U.S. PATENT DOCUMENTS

| | | | | |
|---|---|---|---|---|
| 4,497,258 A * | 2/1985 | Ruhmann | ............... | B61D 7/02 |
| | | | | 105/418 |
| 5,119,738 A * | 6/1992 | Snead | ..................... | B61D 7/04 |
| | | | | 105/247 |
| 7,861,659 B2 * | 1/2011 | Gillis | ........................ | B61F 1/02 |
| | | | | 105/247 |
| 10,562,545 B2 * | 2/2020 | Gillis | .................. | B61D 17/048 |

* cited by examiner

STEEL FRAME PARTITION

HOPPER RAILCAR COMPOSITE PARTITION

RELATED APPLICATION

This application claims priority to U.S. Provisional Application Ser. No. 62/882,727, entitled "HOPPER RAILCAR COMPOSITE PARTITION," filed Aug. 5, 2019.

TECHNICAL FIELD OF THE INVENTION

This disclosure relates generally to railcars, and more particularly to a composite partition for use in a hopper railcar.

BACKGROUND

Hopper railcars are used to transport a variety of commodities, including grains, plastic pellets, dried distillers grain, and fertilizers such as potash and fly ash. A hopper railcar typically contains two or more hoppers, although single hopper cars do exist. The number of hoppers chosen for a given hopper railcar may depend on both the commodities to be shipped and the unloading capabilities at the destination location. Multiple hoppers are usually separated by partitions. These partitions function not only to separate the commodities transported within the hoppers, enabling controlled unloading of the commodities, but also to strengthen the structure of the railcar.

SUMMARY

Hopper railcars are used to transport a variety of commodities, including grains, plastic pellets, dried distillers grain, and fertilizers such as potash and fly ash. A hopper railcar typically contains two or more hoppers, although single hopper cars do exist. The number of hoppers chosen for a given hopper railcar may depend on both the commodities to be shipped and the unloading capabilities at the destination location. Multiple hoppers are usually separated by partitions. These partitions function not only to separate the commodities transported within the hoppers, enabling controlled unloading of the commodities, but also to strengthen the structure of the railcar.

The partitions in hopper railcars are subjected to various loads during the operation of the railcars, including structural loads imposed by the railcars travelling over the rails, as well as loads imposed by the commodities, themselves, that are transported within the railcars. These loads tend to arise when the railcars are subjected to longitudinal accelerations and/or decelerations. In the event of a crash, or the use of an emergency brake, the commodity loads imposed on a partition may be large enough to cause the partition to bend and/or buckle, generating a force that may pull the sides of the railcar towards the center of the car. To avoid this situation, manufacturers typically employ partitions of significant weight, typically sufficient to withstand such loads without bending/buckling. However, the significant weight of these partitions may decrease the efficiency of the railcars. For example, the weight of the partitions may result in decreased capacity of the hopper cars, as compared with hopper railcars containing lighter partitions. As another example, the weight of the partitions may result in increased fuel consumption, as compared with hopper railcars containing lighter partitions.

Previous attempts have been made to design hopper railcar partitions using composite materials such that the overall weight of the partitions is decreased, but the load-withstanding capabilities of the partitions are maintained, as compared to partitions formed entirely from steel. However, none of these attempts have proven fully satisfactory. For example, many such attempts have been undertaken as part of manufacturing a composite railcar in which the partitions are permanently bonded to the rest of the railcar body. Unfortunately, this makes repair and/or replacement of a damaged partition difficult or impossible. Additionally, such a partition may not easily be replaced (if it is possible to replace the partition at all), in the event that a different partition, with different structural properties and performance is desired.

This disclosure contemplates a hopper railcar composite partition that addresses one or more of the above issues. The composite partition includes a metal frame, capable of providing structural support to withstand the structural loads experienced by a typical railcar, along with a lighter, composite section, capable of withstanding the loads exerted by typical commodities transported in the railcar. The use of a lighter weight composite section in place of a steel center portion may result in significant weight savings, as compared to a partition composed entirely of steel. This disclosure further contemplates that the composite section of the partition may be mechanically fastened to the metal frame of the partition. In this manner, the composite section of the partition may be easily removed for repair/replacement, while the metal frame may remain in position, continuing to provide structural support to the railcar.

Certain embodiments of the hopper railcar composite partition may provide one or more technical advantages. For example, an embodiment may provide sufficient support to withstand both the structural loads experienced by a typical hopper partition, as well as the loads imposed by typical commodities transported within the hoppers of a hopper railcar, while weighing less than a comparable all-steel partition. As another example, an embodiment may increase the fuel efficiency of a hopper railcar. As another example, an embodiment may provide increased commodity capacity for a hopper railcar. As another example, an embodiment may enable easy replacement/repair of a hopper partition. As a further example, an embodiment may enable customization of a hopper partition based on desired structural properties and performance. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 9 of the drawings, like numerals being used for like and corresponding parts of the various drawings.

Hopper railcars are used to transport a variety of commodities, including grains, plastic pellets, dried distillers grain, and fertilizers such as potash and fly ash. A hopper railcar typically contains two or more hoppers, although single hopper cars do exist. The number of hoppers chosen for a given hopper railcar may depend on both the commodities to be shipped and the unloading capabilities at the destination location. Multiple hoppers are usually separated by partitions. These partitions function not only to separate the commodities transported within the hoppers, enabling controlled unloading of the commodities, but also to strengthen the structure of the railcar.

The partitions in hopper railcars are subjected to various loads during the operation of the railcars, including structural loads imposed by the railcars travelling over the rails, as well as loads imposed by the commodities, themselves, that are transported within the railcars. These loads tend to arise when the railcars are subjected to longitudinal accelerations and/or decelerations. In the event of high longitudinal accelerations/decelerations of the railcar, the commodity loads imposed on a partition may be large enough to cause the partition to bend and/or buckle, generating a force that may pull the sides of the railcar towards the center of the car. To avoid this situation, manufacturers typically employ partitions of significant weight, typically sufficient to withstand such loads without bending/buckling. However, the significant weight of these partitions may decrease the efficiency of the railcars. For example, the weight of the partitions may result in decreased capacity of the hopper cars, as compared with hopper railcars containing lighter partitions. As another example, the weight of the partitions may result in increased fuel consumption, as compared with hopper railcars containing lighter partitions.

Previous attempts have been made to design hopper railcar partitions using composite materials such that the overall weight of the partitions is decreased, but the load-withstanding capabilities of the partitions are maintained, as compared to partitions formed entirely from steel. However, none of these attempts have proven fully satisfactory. For example, many such attempts have been undertaken as part of manufacturing a composite railcar in which the partitions are permanently bonded to the rest of the railcar body. Unfortunately, this makes repair and/or replacement of a damaged partition difficult or impossible. Additionally, such a partition may not easily be replaced (if it is possible to replace the partition at all), in the event that a different partition, with different structural properties and performance is desired.

This disclosure contemplates a hopper railcar composite partition that addresses one or more of the above issues. The composite partition includes a metal frame, capable of providing structural support to withstand the structural loads experienced by a typical railcar, along with a lighter, composite section, capable of withstanding the loads exerted by typical commodities transported in the railcar. The use of a lighter weight composite section in place of a steel center portion may result in significant weight savings, as compared to a partition composed entirely of steel. This disclosure further contemplates that the composite section of the partition may be mechanically fastened to the metal frame of the partition. In this manner, the composite section of the partition may be easily removed for repair/replacement, while the metal frame may remain in position, continuing to provide structural support to the railcar. The hopper railcar composite partition will be described in further detail using FIGS. 1 through 9.

Figure 1A:
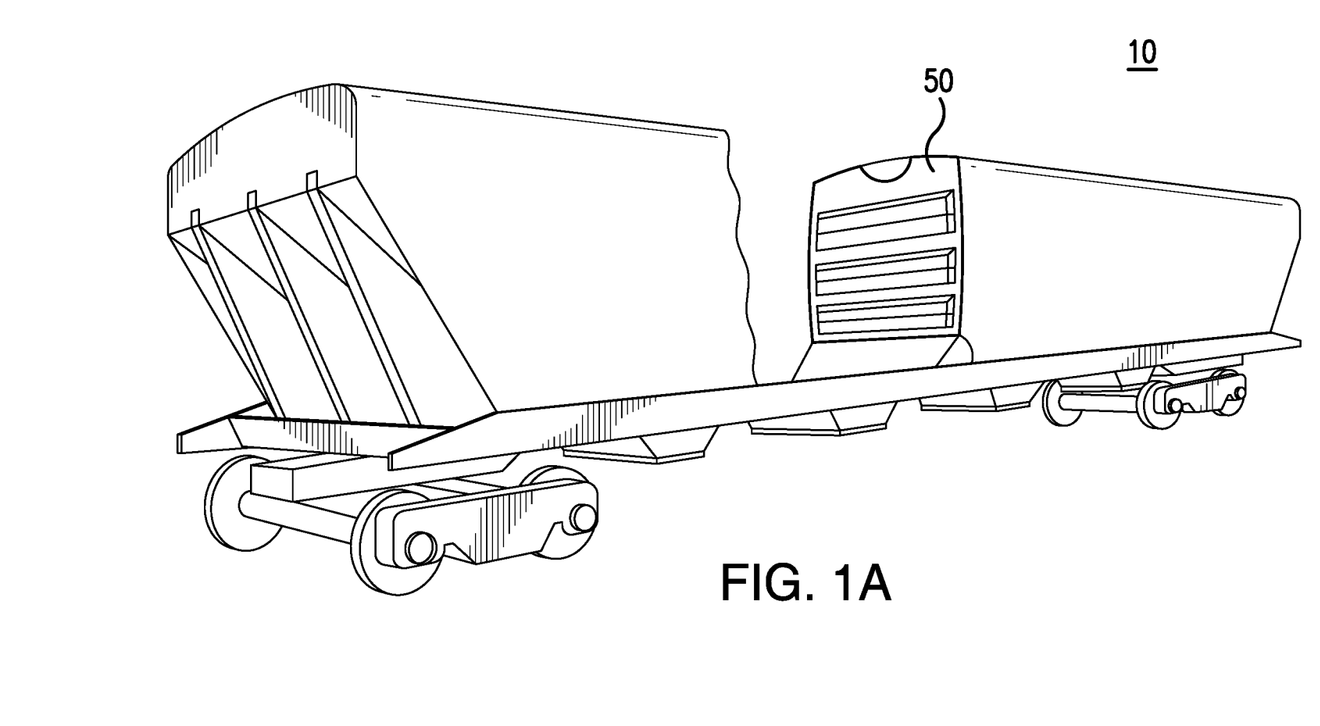
FIG. 1A illustrates an example composite partition installed in a hopper railcar.

FIG. 1A illustrates a hopper railcar 10 in which hopper railcar composite partition 50 has been installed. For ease of viewing composite partition 50, a portion of the sidewall of hopper railcar 10 has been removed from the figure. This disclosure contemplates that composite partition 50 may include a metal frame onto which one or more composite sections may be attached, as described in further detail below. This disclosure additionally contemplates that any number of hopper railcar composite partitions 50 may be installed in hopper railcar 10.

Figure 1B:
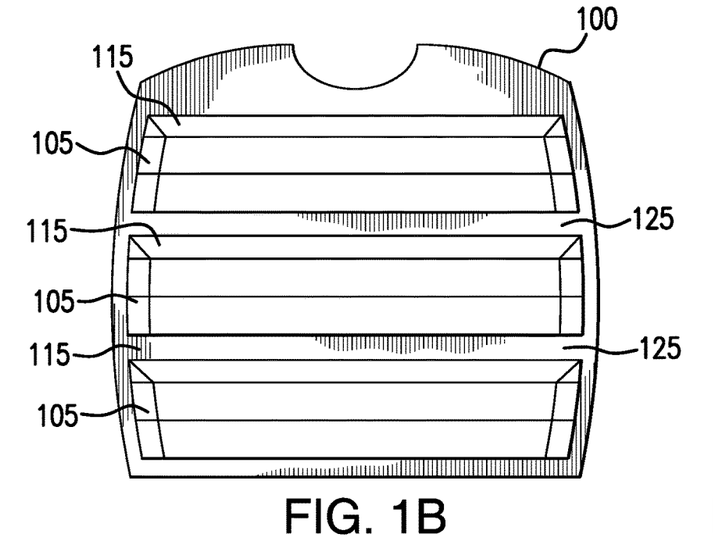
FIGS. 1B and 1C illustrate a front view and a side view of a composite section of the example composite partition of FIG. 1A.
Figure 1C:
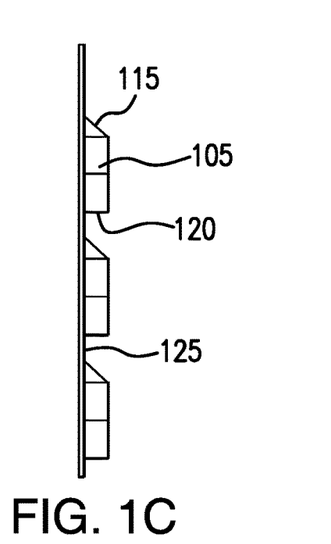

FIGS. 1B and 1C illustrate an example composite section 100 that may be attached to a metal frame to form composite partition 50. FIG. 1B illustrates a front view of composite section 100, while FIG. 1C illustrates a side view of composite section 100, in which composite section 100 of FIG. 1B has been rotated by ninety degrees.

This disclosure contemplates that composite section 100 may be composed of any material or combination of materials such that composite section 100 may be capable of withstanding the loads exerted by typical commodities transported in a railcar, while nevertheless being lighter weight than a comparable steel partition. For example, in certain embodiments, composite section 100 may be composed of varying glass or carbon fibers, cellulose, polymer materials, or other organic or non-organic fibers. As another example, in certain embodiments, composite section 100 may be composed of a fabric impregnated with resin. In some embodiments, the fiber material may be present in composite section 100 in one or more forms, such as chopped, woven, or non-woven. In some embodiments, composite section 100 may additionally include internal framing, or other supporting materials.

This disclosure contemplates that the dimensions and/or composition of the composite section 100 may be varied across the section, as needed, to withstand the loads and deflections the section may be subjected to. For example, in certain embodiments, the composition of composite section 100 may be varied and/or the thickness of composite section 100 may be increased in areas of composite section 100 that typically experience the greatest strain. Thickness, fiber type and orientation may also be varied to help support the metal frame or other railcar structures.

As an example of the use of varying composition and dimensions for composite section 100, in certain embodiments, and as illustrated in FIG. 1, composite section 100 may be composed of a plurality of transverse composite beams 105. In other embodiments, beams may be oriented vertically, at an angle, or any other orientation or combination of orientations. Beams may be of various sizes, and beams of different sizes may be used on the same partition. In some embodiments, there may be one beam, while in other embodiments, there may be multiple beams. Beams may have cross-sectional shapes that are rectangular, circular, or any of a number of different shapes or combinations of shapes. In some embodiments, the beam may be one large rectangular member. This disclosure contemplates that, in some embodiments, some or all of beams 105 may be integrally molded together to form one part. In certain embodiments, and as illustrated in FIG. 1, beams 105 may extend in an outward direction from flat material 125. In some embodiments, material 125 may be laminate. In certain embodiments, beams 105 may be separated from one another by areas of material 125 to permit sectioning of composite section 100, which may facilitate installation and removal, as described in further detail below, in the discussion of FIG. 6.

The beams illustrated in the example are preform beams, but in particular embodiments the beams may be constructed from a range of materials to achieve the same structural benefit.

In certain embodiments, beams 105 may be constructed from fabric or layers of fabric, surrounding a structural core. This disclosure contemplates that in certain embodiments, the fabric may be impregnated with resin, as described above, and may be present in one or more forms, such as chopped, woven, or non-woven. In certain embodiments, the layers of fabric surrounding the structural core may be laminated together. This disclosure contemplates that the number of layers and the materials used for the layers may be varied based on both design requirements and cost. For example, other materials that provide less support may be used in regions of composite section 100 expected to experience lower levels of strain.

This disclosure contemplates that the structural cores of beams 105 may contain any suitable material. For example, in certain embodiments, the cores may include foam, wood, polymer, or any combination of these materials. In some embodiments, the cores may include internal framing, or other supporting materials, to provide additional structural support.

In some embodiments, vinyl ester resin types may be preferred, but any suitable or thermoplastic resin can be used. Construction may also make partial or complete use of pre-impregnated materials (fibers and resins combined). Processing can be done using open mold wet layup, vacuum infusion, vacuum assisted resin transfer molding (VRTM), resin transfer molding (RTM), compression molding, or any other molding process known to those skilled in the art. The components can be room-temperature cured, oven post cured, or oven cured.

In certain embodiments, top surface 115 of beams 105 may be sloped downward, to discourage pieces of the commodity from resting on top surface 115. This may be desirable so that minimal amounts of the commodity remain inside the hopper railcar when the railcar is emptied. In addition to top surface 115 being sloped, this disclosure contemplates that top surface 115 may also be shaped in any other manner which may discourage the commodity from resting on top surface 115. For example, in certain embodiments, top surface 115 may be curved. In certain embodiments, bottom surface 120 of beams 105 may be approximately perpendicular to laminate 125. This may be desirable to help maximize the strength of beam 105. This disclosure contemplates that the number of beams 105, the sizes of beams 105, and the orientations of beams 105 may vary based on the performance desired.

As another example of the use of varying composition and/or dimensions for composite section 100, the design may be customized to provide increased energy absorption. As described in further detail below, in the discussion of FIG. 5, the internal beam construction may include curved internal stiffeners to increase energy absorption. In certain embodiments composite section 100 may contain a bubble structure located around the middle of section 100 and pointing outward, towards the commodity located in the hopper. In certain such embodiments, the bubble may contain a foam core, or a core of any other suitable material. In some embodiments, the bubble may contain internal stiffening ribs and/or high-shear-strength laminates to provide additional support.

In certain embodiments, the use of custom beams or a bubble structure on composite section 100 may be desirable in the event of an end impact to a hopper railcar employing a partition 50 containing composite section 100. During such an end impact, the commodity transported within the railcar may push against the beams or bubble. In response, the beams or bubble may deform, thereby absorbing some of the inertial energy of the commodity. In such embodiments, it may be desirable to employ a pair of composite sections 100, each containing beams or a bubble structure, so that the beams or bubble structure may be present on both sides of composite partition 50, or to employ a single composite section 100, with a beam or bubble structure present on both sides of the section. In this manner, depending on which end of the railcar that is impacted, one of the sides of partition 50 may absorb energy, while the other side may be largely unaffected. In this manner, the use of one or more beams or bubble structures on composite partition 50 may help to attenuate the peak forces imposed on a railcar containing the partition during end impacts.

This disclosure contemplates that composite section 100 may contain one or more beams or bubble structures, customizable as desired. This disclosure further contemplates that these beams or bubble structures may be of a variety of different shapes and sizes.

In addition to the use of beams 105 and bubble structures, as described above, this disclosure contemplates that composite sections 100 may be shaped in any appropriate manner and may contain any appropriate composite materials. For example, in certain embodiments, rather than being flat, as illustrated in FIG. 1, composite section 100 may be curved or may bow away from the metal frame on which it is attached. Additionally, this disclosure contemplates that composite section 100 may easily be scaled to accommodate different sized railcars. Due to the flexibility of its design, composite section 100 may easily be customized to provide support against a range of different loads, many of which may depend on the type of commodity transported. Composite section 100 may provide such support without compromising the structural integrity of the railcar, which may be maintained by the metal frame portion of composite partition 50, as described in further detail below, in the discussion of FIGS. 3 and 4.

Figure 2:
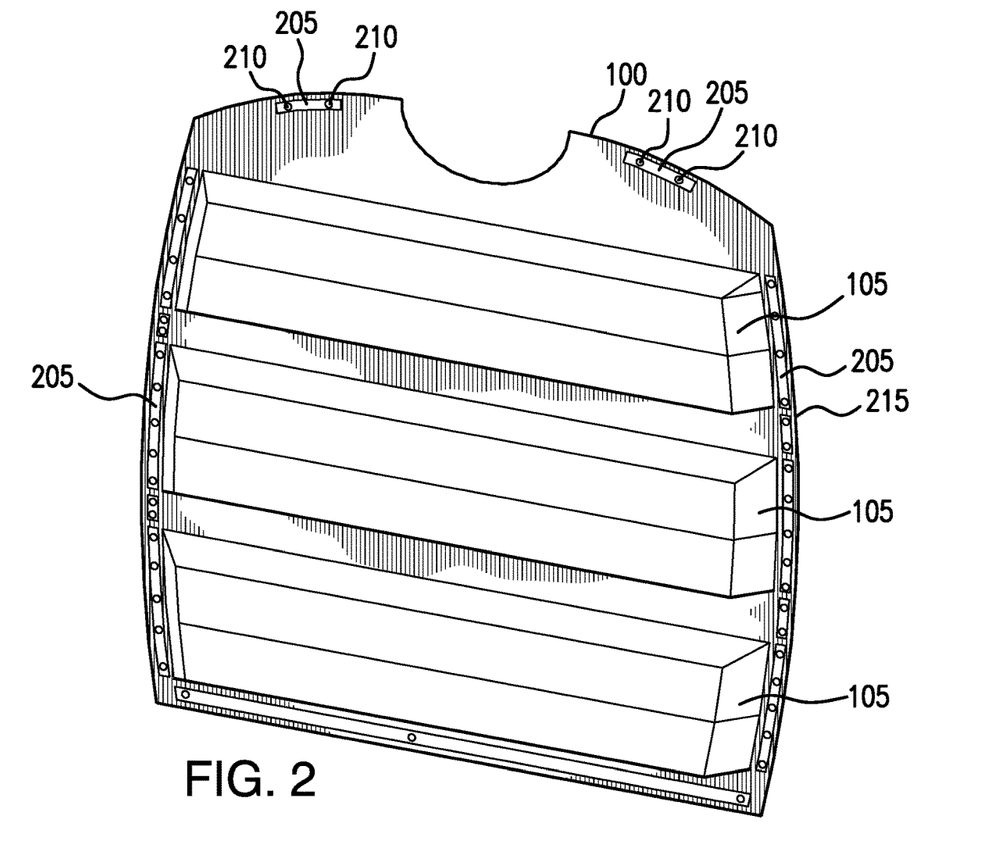
FIG. 2 presents an isometric view of the composite section of FIG. 1, illustrating example locations of fastener holes that may be used to attach the composite section to a metal frame of the example composite partition of FIG. 1A.

FIG. 2 presents an isometric view of composite section 100, providing additional detail. In particular, FIG. 2 illustrates the use of metal plates 205 attached to flange 215, located around the outer edge of composite section 100, along with fastener holes 210 extending through metal plates 205 and flange 215. This disclosure contemplates that fastener holes 210 may be used to attach composite section 100 to the metal frame of composite partition 50, which may itself contain holes at similar locations to those of fastener holes 210.

In certain embodiments, flange 215 may include a section of flat laminate. Flange 215 may provide a transition from the interior of composite section 100 to the metal frame to which composite section 100 may attach. In this manner, flange 215 may be used to isolate the interior of composite section 100 from potentially damaging forces and deflections applied by the railcar structure, while nevertheless allowing commodity loads applied to composite section 100 to distribute to the metal frame.

In certain embodiments, and as illustrated in FIG. 2, metal plates 205 may be attached to flange 215 at and around the locations of fastener holes 210, with each fastener hole 210 extending through a metal plate 205. This disclosure contemplates that each metal plate 205 may contain any number of fastener holes 210. Metal plates 205 may help to distribute loads generated by the fasteners that are used to fasten composite section 100 to the metal frame of composite partition 50 into composite section 100, potentially reducing the likelihood that composite section 100 experiences cracks and/or breaks as a result of such loads.

Figure 3:
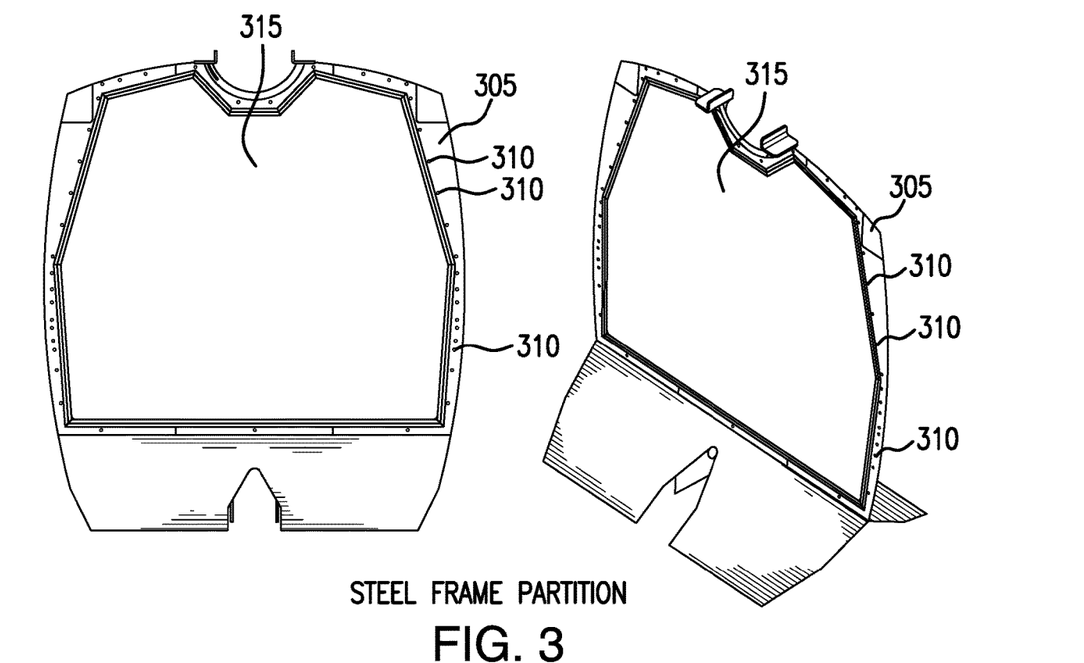
FIG. 3 illustrates a metal frame of the example composite partition of FIG. 1A.

FIG. 3 illustrates frame 305 to which at least one composite section 100 may be attached to form the hopper railcar composite partition. This disclosure contemplates that frame 305 may be a metal plate from which a large central portion has been removed, leaving hole/opening 315 and an outer perimeter of metal surrounding opening 315. Composite section 100 may then be configured to attach to the outer perimeter of frame 305 and to cover opening 315, such that when installed in a typical hopper railcar, composite section 100 may provide sufficient support to withstand the loads exerted on composite partition 50 by typical commodities transported in the railcar, while frame 315 may provide sufficient structural support to withstand the structural loads experienced by the partition.

This disclosure contemplates that opening 315 may be of any size or shape. For example, in certain embodiments, opening 315 may be rectangular in shape. In other embodiments, opening 315 may be elliptical in shape. As another example, in certain embodiments, the area of opening 315 may make up more than 50% of the total area of the shape formed from the outer perimeter of frame 305. In some embodiments, the area of opening 315 may make up more than 75% of the total area of the shape formed from the outer perimeter of frame 305.

In certain embodiments, frame 305 may be a steel frame. This disclosure contemplates that frame 305 is of a sufficient strength to provide support for portions of the side walls, roof, and floor of a standard hopper railcar. Additionally, this disclosure contemplates that frame 305 is of sufficient strength to withstand loads imposed on composite partition 50 due to railcar twisting, end impacts, vertical and lateral accelerations, as well as any other forces experienced by the railcar during operation. While described as a metal frame throughout this disclosure, this disclosure contemplates that frame 305 may be formed from any material of suitable strength to provide support for these above-described loads.

As illustrated in FIG. 3, the perimeter of frame 305 contains a series of fastener holes 310. This disclosure contemplates that fastener holes 310 are located at positions around the perimeter of frame 305 such that fastener holes 210 on composite section 100 align with fastener holes 310 on frame 305, when composite section 100 is positioned against frame 305 for attachment. In certain embodiments, frame 305 may contain a greater number of fastener holes 310 than composite section 100. This may be desirable as fastener holes 210 may be located at different positions on different composite section 100. In such situations the locations and number of fasteners 310 may be such that both a first composite section 100 and a second composite section 100 containing fastener holes 210 at different locations from the first composite section 100 may be able to attach to frame 305.

Figure 4:
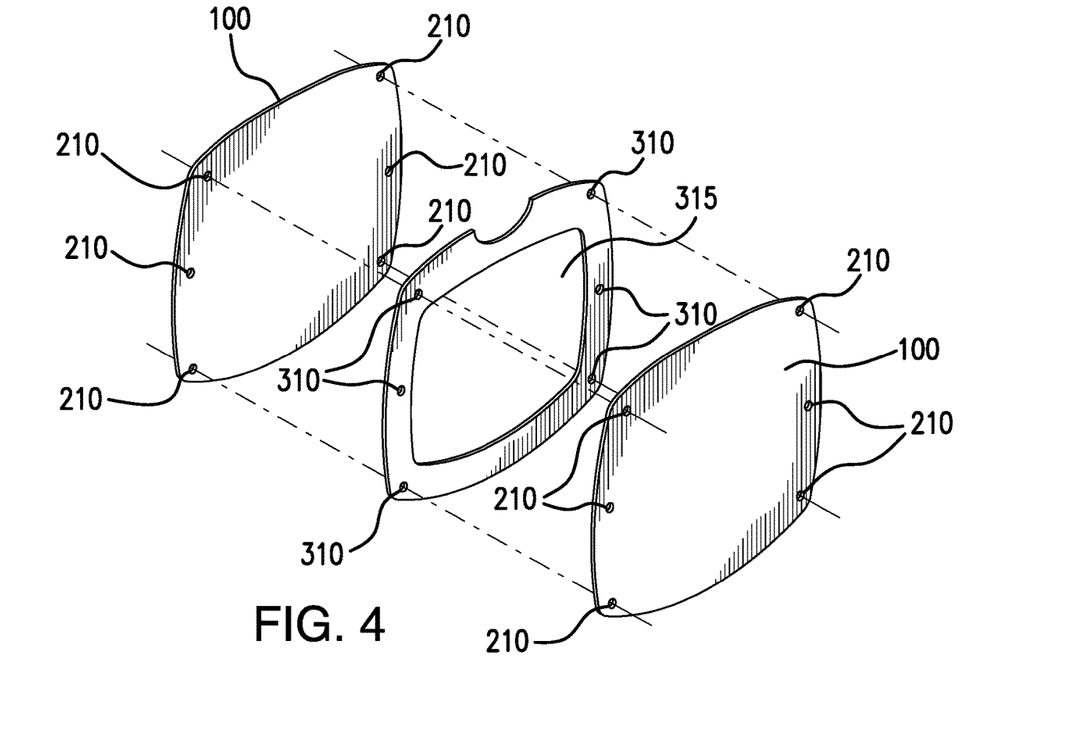
FIG. 4 illustrates a pair of composite sections to be attached to a metal frame to form the example composite partition of FIG. 1A.

FIG. 4 provides a simplified example illustrating a pair of composite sections 100 configured to attach to frame 305 using a set of six fastener holes 210 on each composite section 100. A first composite section 100 may be attached to a first side of frame 305, and a second composite section 100 may be attached to a second side of frame 305. As can be seen, these fastener holes 210 are positioned on each composite section 100 such that they align with six fastener holes 310 positioned around the perimeter of frame 305. This disclosure contemplates that composite sections 100 may be attached to frame 305 in any suitable manner. For example, in certain embodiments, composite section 100 may be attached to frame 305 using bolts, rivets, or any other suitable fasteners. As another example, in certain embodiments, composite section 100 may be attached to frame 305 using clamps or pins.

As described above, in the discussion of FIG. 2, composite section 100 may be attached to frame 305 along a mounting flange 215 of composite section 100. In certain embodiments, mounting flange 215 may include a section of flat laminate. Mounting flange 215 may help to isolate the interior structure of composite section 100 (e.g., beams 105, bubble structures, or any other interior structure) from potentially damaging forces and deflections imposed on frame 305 from the railcar structure, while nevertheless allowing commodity loads imparted on composite section 100 to distribute to frame 305. In certain embodiments, the design of composite section 100 and frame 305 is optimized such that a first failure mode of composite partition 50 is a failure of the fasteners. In this manner, certain embodiments of composite partition 50 reduce the chances of damage to composite partition 100.

Figure 5:
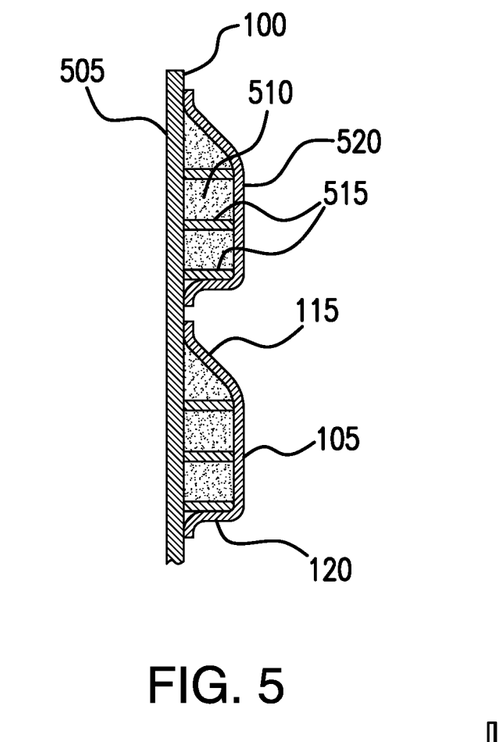
FIG. 5 illustrates a cross-section of a portion of the composite section of the example composite partition of FIG. 1A.

FIG. 5 illustrates a cross-section of a portion of composite section 100 that includes two beams 105. As can be seen in FIG. 5, in certain embodiments, composite section 100 includes underlayment 505, beam outer layers 520, core material 510, and internal walls 515. In certain embodiments, underlayment 505 may be formed from flat laminate and extend over the entire area of composite section 100, such that flange 215 may correspond to the outer perimeter region of underlayment 505. In certain embodiments, underlayment 505 may be constructed from fiber materials with the fiber orientation optimized to maximize the strength of composite section 100. In some embodiments, underlayment 505 may be constructed from fiber materials with the fiber orientation optimized to control deflection of composite section 100 in a desired fashion. In certain embodiments, underlayment 505 may include layers of fiber materials in which the fiber orientations in each layer are optimized to maximize the strength of composite section 100 and/or control deflection of composite section 100 in a desired fashion, such that different layers may have different fiber orientations. This disclosure contemplates that in some embodiments, the fiber materials may include fabric impregnated with resin. In some embodiments, the fiber layers of underlayment 505 may be laminated.

In certain embodiments, beam outer layers 520 may also be constructed from fiber materials, similar to underlayment 505. For example, in certain embodiments, beam outer layers 520 may be formed from glass or carbon fibers, cellulose, polymer fibers, or other organic or inorganic fibers with the orientations of the fibers optimized to maximize the strength of beams 105 and/or to control deflection of composite section 100 in a controlled manner. In some embodiments, beam outer layers 520 may be constructed from fabric or layers of fabric. This disclosure contemplates that in certain embodiments, the fabric may be impregnated with resin and may be present in one or more forms, such as chopped, woven, or non-woven. In certain embodiments, beam outer layers 520 may be formed from layers of fabric that are laminated together. This disclosure contemplates that the number of layers and the materials used for the layers may be varied based on both design requirements and cost. For example, other materials which provide less support may be used in regions of composite section 100 expected to experience lower levels of strain.

This disclosure contemplates that the structural cores 510 of beams 105 may include any suitable material. For example, in certain embodiments, the cores may include foam, wood, polymer, or any combination of these materials. In some embodiments, the cores may contain internal framing, to provide additional structural support, such as internal walls 515 illustrated in FIG. 5. This disclosure contemplates that internal walls 515 may be formed from any material suitable to provide sufficient structural support to beams 105. For example, in certain embodiments, internal walls 515 may be formed from high-shear-strength laminates. In some embodiments, internal walls 515 may be horizontal walls, extending from underlayment 505 to beam outer layer 520 in an approximately perpendicular direction. In certain embodiments, internal walls 515 may be curved rather than horizontal. For example, in certain embodiments, internal walls 515 may be "C"-shaped. This may be desirable as it may help to extend the fatigue life of beams 105. For example, in the event of an end impact to a hopper railcar employing a partition containing composite section 100, the commodity transported within the railcar may push against beams 105. In such situations, the presence of "C"-shaped internal walls 515 may increase the ability of beams 105 to absorb inertial energy of the commodity due to an increased capacity for deflection, as compared to horizontal internal walls; in such situations, "C"-shaped internal walls 515 may act as internal springs. In a similar manner, beams 105 may be constructed in a manner to further increase their energy absorption capabilities, by adding curves to the surface of beams 105 (i.e., outer layer 520).

In certain embodiments, top surface 115 of beams 105 may be sloped downward, to discourage pieces of the commodity from resting on top surface 115. This may be desirable so that minimal amounts of the commodity remain inside the hopper railcar when the railcar is emptied. In addition to top surface 115 being sloped, this disclosure contemplates that top surface 115 may also be shaped in any other manner which may discourage commodity from resting on top surface 115. For example, in certain embodiments, top surface 115 may be curved. In certain embodiments, bottom surface 120 of beams 105 may be approximately perpendicular to laminate 125. This may be desirable to help maximize the strength of beam 105. This disclosure contemplates that the number of beams 105, the sizes of beams 105, and the orientations of beams 105 may vary widely based on the performance desired.

In certain embodiments, composite section 100 may be coated with a coating to protect section 100 from abrasion damage that may otherwise be inflicted on composite section 100 by various commodities transported within the hopper railcar in which composite section 100 is installed. In some embodiments, composite section 100 may be coated with a coating to protect section 100 from ultraviolet radiation damage. In some embodiments, the coating may be food grade-rated to allow for the transport of commodities intended for human consumption.

Figure 6:
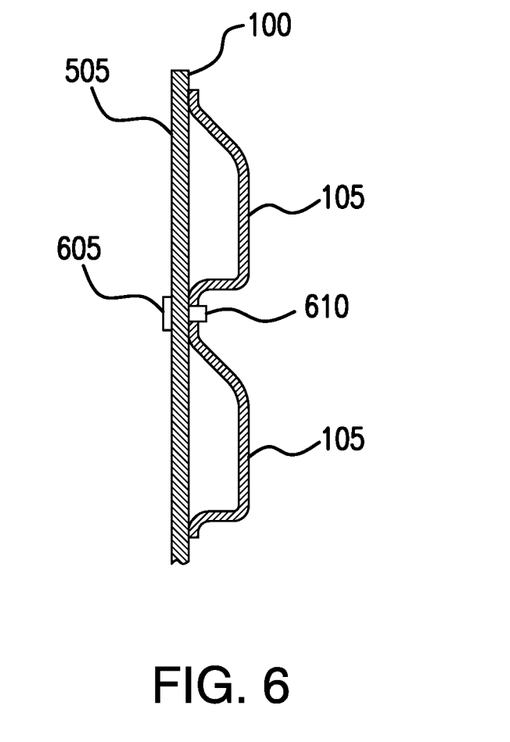
FIG. 6 illustrates a side view of a portion of the composite section of the example composite partition of FIG. 1A in an embodiment in which the composite section is composed of multiple parts.

In certain embodiments, composite section 100 may be composed of one or more pieces. FIG. 6 illustrates a portion of a composite section 100 composed of multiple pieces. The use of a composite section 100 composed of multiple pieces may be desirable to help facilitate installation, repair, and/or removal of composite section 100 from a hopper railcar. For example, in certain embodiments, the hopper railcars into which composite partitions may be installed may be covered hopper railcars. Such railcars have a roof to protect the commodity being transported within the railcar from the external environment. These roofs may contain one or more openings, such as a trough or a smaller opening. Different hopper railcars may have roof openings of various sizes and shapes. In such situations, it may not be possible to fit the entire composite section 100 through such a roof opening when installing and/or removing composite section 100 from the railcar. Accordingly, certain embodiments contemplate forming composite section 100 from a set of smaller pieces. For example, in certain embodiments, the flat areas of laminate 125 between adjacent beams 105 may facilitate sectioning of beams 105, such that each piece of composite section 100 may contain one or more beams 105. This disclosure contemplates that these smaller pieces may be configured to be inserted into and/or removed from the restricted openings in the roofs of covered hopper railcars. In this manner, in certain embodiments, composite section 100 may be inserted into a hopper railcar piece by piece. After the pieces of composite section 100 have been inserted into the hopper railcar, in certain embodiments, they may be mechanically fastened or bonded together to form composite section 100, which may then be attached to frame 305. In certain embodiments, secondary plates 605 and 610 may be installed over the joints between adjacent pieces of composite section 100 to provide enhanced strength at the joints. This disclosure contemplates that secondary plates 605 and 610 may be formed from metal or any other material of suitable strength. In other embodiments, after the pieces of composite section 100 have been inserted into the hopper railcar, the pieces may be individually attached to frame 305. This disclosure contemplates that each of the pieces of composite section 100 may be similar to one another or may be different from one another. For example, in certain embodiments, different pieces may be of different sizes, contain different numbers of beams 105, be composed on different materials, and/or have other different properties from one another.

In certain embodiments, the use of a composite section 100 composed of multiple pieces may be desirable to facilitate repair of a damaged beam 105. In such embodiments, rather than removing the entire composite section 100 to repair the damaged beam, the piece of composite section 100 containing the damaged beam may be removed from the section and replaced with a new piece. The ability to remove pieces of composite section 100 rather than the entire section may also be desirable in situations in which it may be desirable to modify composite section 100 for improved performance, reduced cost, reduced weight, or to provide different coatings for different commodities.

Figure 7:
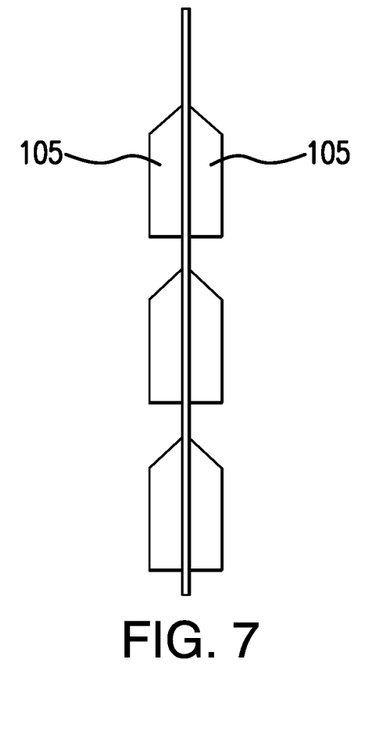
FIG. 7 illustrates a composite section of the example composite partition of FIG. 1A, in an embodiment in which composite beams are attached to both sides of the composite section.

While FIGS. 5 and 6 illustrate a composite section 100 containing beams 105 on only one side of the section, this disclosure contemplates that, in certain embodiments, composite section 100 may contain beams 105 on both sides, as illustrated in FIG. 7. In such embodiments, a single composite section 100 may be attached to frame 305 to form composite partition 50, rather than a pair of composite sections.

Figure 8:
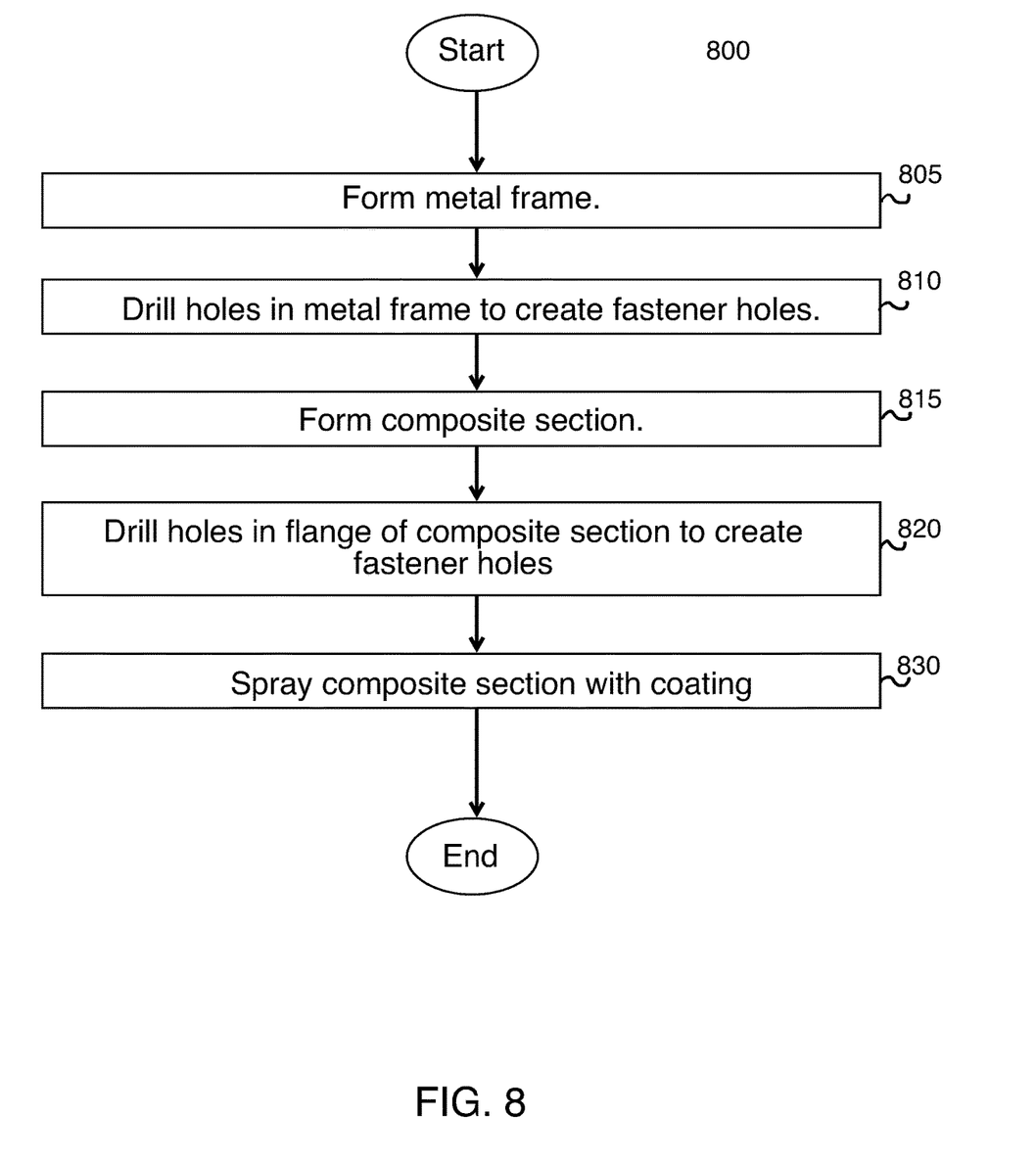
FIG. 8 presents a flowchart illustrating a method by which the composite partition of FIG. 1A may be formed.

FIG. 8 presents a flowchart illustrating a method by which composite partition 50 may be manufactured. In step 805, metal frame 305 is formed. In certain embodiments, metal frame 305 may be formed from a solid piece of metal from which an inner piece of metal is removed to form opening 315. In some embodiments, metal frame 305 may be formed by pouring liquid metal into a form of a suitable shape and size to produce metal frame 305. In step 810, holes are drilled into metal frame 305 to form fastener holes 310. This disclosure contemplates that fastener holes 310 may be used to attach composite sections 100 to metal frame 305.

Composite sections 100 are, themselves, formed in step 815. In certain embodiments forming a composite section 100 includes forming underlayment 505 and forming beam core material 510. In certain embodiments, underlayment 505 may be formed from flat laminate and extend over the entire area of composite section 100, such that flange 215 may correspond to the outer perimeter region of underlayment 505. In certain embodiments, underlayment 505 may be constructed from fiber materials with the fiber orientation optimized to maximize the strength of composite section 100. In some embodiments, underlayment 505 may be constructed from fiber materials with the fiber orientation optimized to control deflection of composite section 100 in a desired fashion. In certain embodiments, underlayment 505 may include layers of fiber materials in which the fiber orientations in each layer are optimized to maximize the strength of composite section 100 and/or control deflection of composite section 100 in a desired fashion, such that different layers may have different fiber orientations. This disclosure contemplates that in some embodiments, the fiber materials may include fabric impregnated with resin.

In certain embodiments, beam core material 510 may include foam, wood, polymer, or any other suitable material or combination of materials. In some embodiments, the cores may include internal framing 515, or other supporting materials, to provide additional structural support.

In certain embodiments, beam outer layers 520 may be attached to beam core material 510 and the resulting beams 105 may then be attached to underlayment 505. In some embodiments, beam core material 510 may first be attached to underlayment 505 and then beam outer layers 520 may be attached to beam core material 510. For example, in certain embodiments, beam outer layers 520 may include a continuous piece of material that may be placed on top of both beam core material 510 and underlayment 505. This disclosure contemplates that beam outer layers 520 may be formed from any suitable material. For example, in certain embodiments, beam outer layers 520 may be formed from fiber materials, similar to underlayment 505. For example, in certain embodiments, beam outer layers 520 may be formed from glass or carbon fibers, cellulose, or polymer fibers, with the orientations of the fibers optimized to maximize the strength of beams 105 and/or to control deflection of composite section 100 in a controlled manner. In some embodiments, beam outer layers 520 may be constructed from fabric or layers of fabric. This disclosure contemplates that in certain embodiments, the fabric may be impregnated with resin and may be present in one or more forms, such as chopped, woven, or non-woven. In certain embodiments, beam outer layers 520 may be formed from layers of fabric that are laminated together.

In step 820, holes are drilled into flange 215 of composite section 100 to create fastener holes 210. This disclosure contemplates that fastener holes 210 may be used to attach composite section 100 to metal frame 305.

Finally, in certain embodiments, composite section 100 may be sprayed with a coating to protect section 100 from abrasion damage that may otherwise be inflicted on composite section 100 by various commodities transported within the hopper railcar in which composite section 100 is installed. In some embodiments, composite section 100 may be coated with a coating to protect section 100 from ultraviolet radiation damage. In some embodiments, the coating may be food grade-rated to allow for the transport of commodities intended for human consumption.

Modifications, additions, or omissions may be made to method 800 depicted in FIG. 8. Method 800 may include more, fewer, or other steps. For example, steps may be performed in parallel or in any suitable order.

Figure 9:
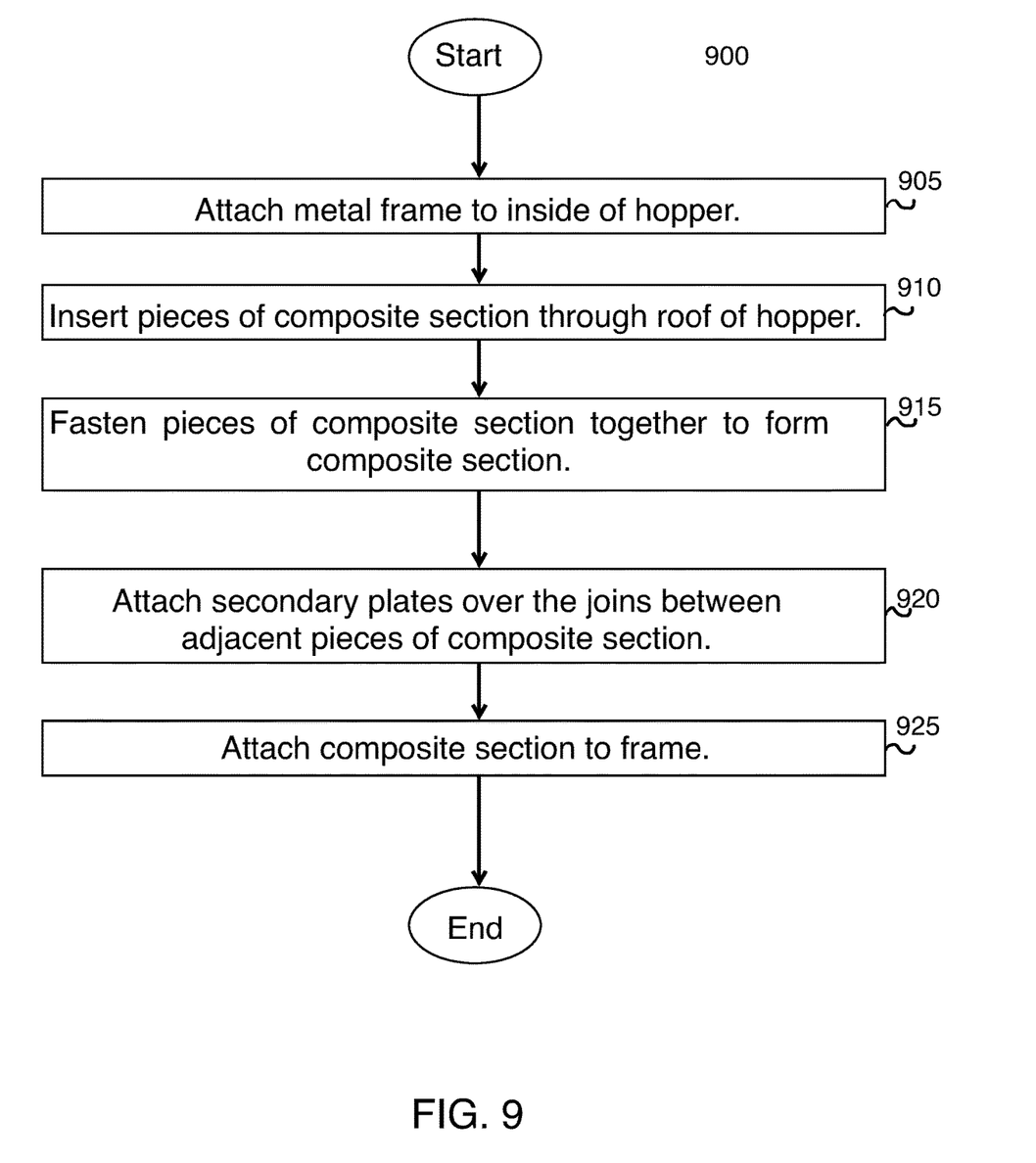
FIG. 9 presents a flowchart illustrating a method by which an embodiment of the composite partition of FIG. 1A that includes a composite section composed of multiple parts may be installed in a typical hopper car.

FIG. 9 presents a flowchart illustrating a method by which an embodiment of composite partition 50 that includes a composite section 100 composed of multiple pieces may be installed in a typical hopper car 10. In step 905 metal frame 305 is attached to the inside of hopper car 10. This disclosure contemplates that metal frame 305 may be attached to the inside of hopper car 10 in any suitable manner. For example, in certain embodiments, metal frame 305 may be attached to the inside of hopper car 10 by welding portions of the outer perimeter of metal frame 305 to the inside of hopper car 10 during the manufacture of hopper car 10.

In step 910, individual pieces of composite section 100 are inserted into hopper car 10, through an opening in the roof of hopper car 10. In step 915, the individual pieces of composite section 100 may be fastened together to form composite section 100. In certain embodiments, the pieces of composite section 100 may be mechanically fastened together to form composite section 100. In some embodiments, the pieces of composite section 100 may be bonded together to form composite section 100. In step 920, secondary plates 605 and 610 may be installed over the joints between adjacent pieces of composite section 100, to provide enhanced strength at these joints. Finally, in step 925, composite section 100 may be attached to frame 305. This disclosure contemplates that composite sections 100 may be attached to frame 305 in any suitable manner. For example, in certain embodiments, composite section 100 may be attached to frame 305 using bolts, rivets, or any other suitable fasteners. As another example, in certain embodiments, composite section 100 may be attached to frame 305 using clamps or pins. This disclosure additionally contemplates that, rather than fastening the individual pieces of composite section 100 together prior to fastening composite section 100 to metal frame 305, in certain embodiments, after the pieces of composite section 100 have been inserted into the hopper railcar, the pieces may be individually attached to frame 305.

Modifications, additions, or omissions may be made to method 900 depicted in FIG. 9. Method 900 may include more, fewer, or other steps. For example, steps may be performed in parallel or in any suitable order.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

The invention claimed is:

1. A railcar comprising at least two hoppers for transporting a commodity, each hopper comprising a pair of side walls and a floor, the railcar further comprising a composite partition separating the at least two hoppers, the composite partition comprising:
a frame comprising a first material coupled to the pair of side walls and the floor at a location separating the at least two hoppers, the frame comprising a center opening, and wherein the frame is configured to provide structural support for structural loads exerted on the pair of side walls and the floor; and
a composite section comprising a second material coupled to the frame and covering the center opening of the frame, wherein the composite section is configured to withstand loads exerted on the composite section by the commodity transported in the at least two hoppers, wherein the composite section comprises a flat laminate and one or more beams coupled to the flat laminate.

2. The railcar of claim 1, wherein the second material is lighter than the first material.

3. The railcar of claim 2, wherein the first material comprises steel and the second material comprises at least one of a glass fiber, carbon fiber, cellulose, polymer, resin impregnated fabric, organic fiber, inorganic fiber, resin impregnated organic fiber, and resin impregnated inorganic fiber.

4. The railcar of claim 1, wherein the composite section comprises one or more independent and separate sections independently coupled to the frame.

5. The railcar of claim 1, wherein the one or more beams are coupled to both sides of the flat laminate.

6. The railcar of claim 1, wherein the one or more beams comprise transverse beams and a top of the one or more beams is sloped to shed the commodity when discharging the commodity from the one or more hoppers.

7. The railcar of claim 1, wherein the flat laminate extends past the one or more beams to form a flange for coupling the composite section to the frame.

8. The railcar of claim 1, wherein the composite section comprises a curved section forming a bubble extending into one of the at least two hoppers.

9. The railcar of claim 1, wherein the composite section is mechanically coupled to the frame.

10. The railcar of claim 9, wherein the composite section comprises openings for mechanically coupling the composite section to the frame, and the openings are reinforced with a third material embedded into the composite section.

11. The railcar of claim 9, wherein the mechanical coupling comprises a failure point below a failure point of the composite section.

12. A composite partition for separating at least two hoppers of a railcar, the composite partition comprising:
a frame comprising a first material and a center opening, wherein the frame is for coupling to a pair of side walls and a floor of the railcar to provide structural support for structural loads exerted on the pair of side walls and the floor; and
a composite section comprising a second material coupled to the frame and covering the center opening of the frame, wherein the composite section is configured to withstand loads exerted on the composite section by a commodity transported in the at least two hoppers, wherein the composite section comprises a flat laminate and one or more beams coupled to the flat laminate.

13. The composite partition of claim 12, wherein the second material is lighter than the first material.

14. The composite partition of claim 13, wherein the first material comprises steel and the second material comprises at least one of a glass fiber, carbon fiber, cellulose, polymer, resin impregnated fabric, organic fiber, inorganic fiber, resin impregnated organic fiber, and resin impregnated inorganic fiber.

15. The composite partition of claim 12, wherein the composite section comprises one or more independent and separate sections independently coupled to the frame.

16. The composite partition of claim 12, wherein the one or more beams are coupled to both sides of the flat laminate.

17. The composite partition of claim 12, wherein the flat laminate extends past the one or more beams to form a flange for coupling the composite section to the frame.

18. The composite partition of claim 12, wherein the composite section comprises openings for mechanically coupling the composite section to the frame, and the openings are reinforced with a third material embedded into the composite section.

* * * * *